United States Patent
Shepard et al.

(10) Patent No.: US 9,641,679 B1
(45) Date of Patent: May 2, 2017

(54) GEOGRAPHIC POLICY ROUTING FUNCTION

(71) Applicant: 911 Datamaster, Inc., Overland Park, KS (US)

(72) Inventors: James Shepard, Overland Park, KS (US); Richard Kelly, Overland Park, KS (US)

(73) Assignee: 911 Datamaster, Inc., Overland Park, KS (US)

( * ) Notice: Subject to any disclaimer, the term of this patent is extended or adjusted under 35 U.S.C. 154(b) by 0 days.

(21) Appl. No.: 14/869,468

(22) Filed: Sep. 29, 2015

Related U.S. Application Data

(60) Provisional application No. 62/056,744, filed on Sep. 29, 2014.

(51) Int. Cl.
*H04M 11/04* (2006.01)
*H04M 3/51* (2006.01)
*H04M 3/42* (2006.01)

(52) U.S. Cl.
CPC ..... *H04M 3/5116* (2013.01); *H04M 3/42348* (2013.01)

(58) Field of Classification Search
USPC ...................................................... 379/37–52
See application file for complete search history.

(56) References Cited

U.S. PATENT DOCUMENTS

| 2007/0041513 A1* | 2/2007 | Gende ............... H04M 7/128 379/37 |
| 2011/0250906 A1* | 10/2011 | Siomina .............. H04W 4/02 455/456.2 |
| 2013/0308762 A1* | 11/2013 | Nelson ............ H04M 3/5116 379/45 |

OTHER PUBLICATIONS

"NENA Data Standards for Local Exchange Carriers, ALI Service Providers & 9-1-1 Jurisdictions" by National Emergency Number Assoc Technical Committee Chairs, Issue 3, Nov. 9, 2004.

* cited by examiner

*Primary Examiner* — Maria El-Zoobi
(74) *Attorney, Agent, or Firm* — Erickson Kernell IP, LLC

(57) ABSTRACT

A policy routing function ("PRF") allows requests for emergency services (e.g., 9-1-1 calls, text messages to 9-1-1, etc.) dynamically routed to an emergency responder based on rules and/or user defined geographic overrides in support of Next Generation 9-1-1. Each user provided geographic polygon layer within this data set is represented by one or more polygons, with each polygon containing routing criteria, routing rules, priority, and expiration parameters. This geographic data set may also have a base geographic polygon layer of one or more polygons that define the "normal" or "default" routing conditions. Utilizing a user provided geographic data set the PRF interrogates an emergency caller's location against the polygon(s) and applies the routing rules of the highest level geographic polygon layer polygon that has a true routing condition.

8 Claims, 1 Drawing Sheet

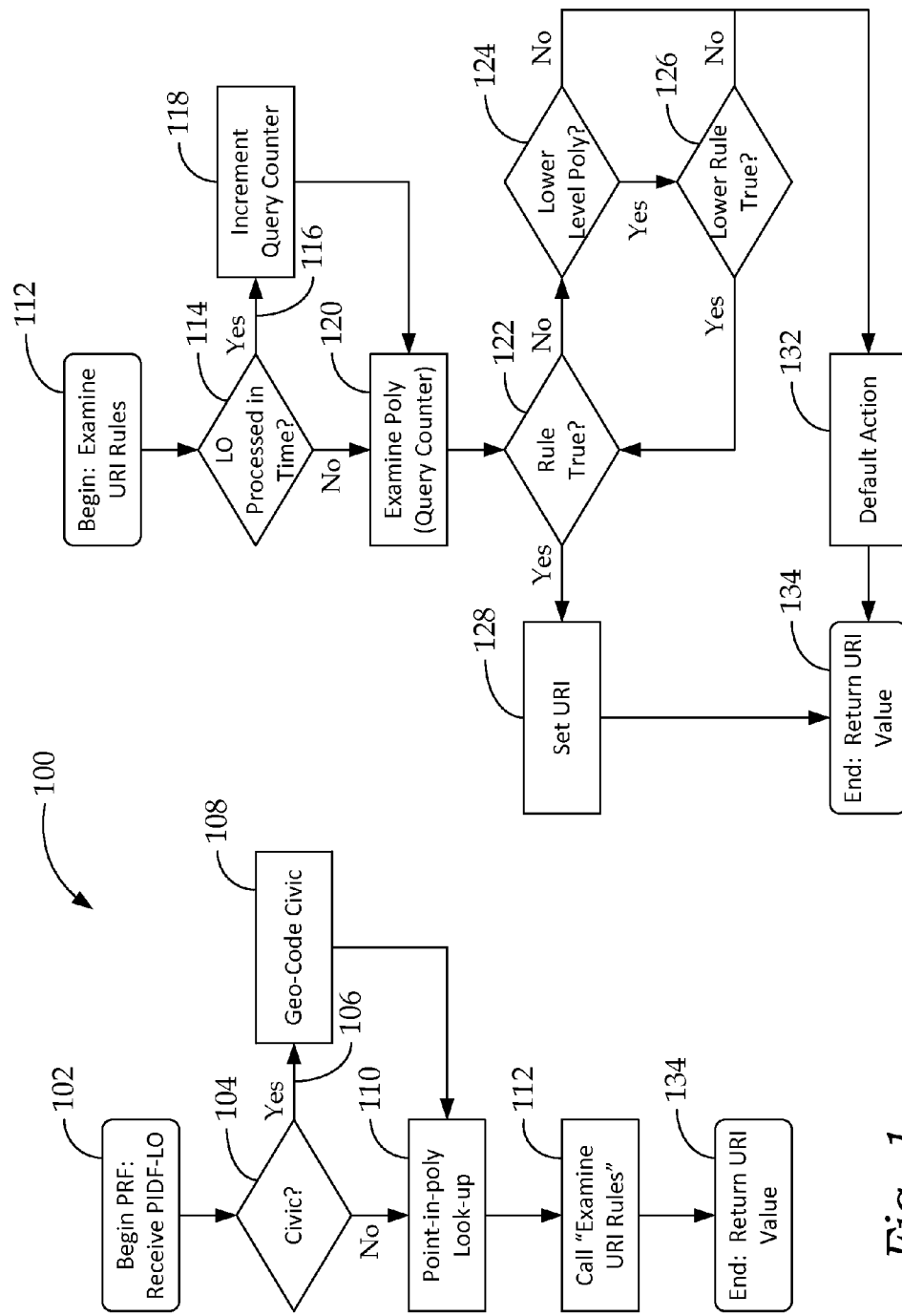

GEOGRAPHIC POLICY ROUTING FUNCTION

CROSS REFERENCE TO RELATED APPLICATIONS

This claims the benefit of provisional application Ser. No. 62/056,744, filed Sep. 29, 2014, entitled "Geographic Policy Routing Function".

FIELD

The present invention relates generally to a policy routing function ("PRF") that allows requests for emergency services (e.g., 9-1-1 calls, text messages to 9-1-1, etc.) to be dynamically routed to an emergency responder based on rules and/or user defined geographic overrides. This is in support of, and supplemental to the National Emergency Number Association's ("NENA") design considerations for what is generally referred to as Next Generation 9-1-1 ("NG9-1-1").

BACKGROUND

In today's emergency calling environment (hereafter referred to as "9-1-1" although the invention is applicable to other dialing strings throughout the world), calls are routed to Public Safety Answering Points ("PSAPs") based almost solely on the estimated location of the caller. If a particular PSAP desires to have their calls delivered elsewhere, they generally have to perform network level changes to affect a re-direction. NG9-1-1 desires to have this capability automated by using policies enacted by the proper authority for the PSAP (hereafter referred to as "PRF Administrator").

NENA describes a policy routing as "the determination of the next hop a call or event is forwarded to by an Emergency Service Routing Proxy as set forth in NENA 08-003, "Detailed Functional and Interface Specification for the NENA i3 Solution," Section 5.2.1.5. A PRF is a functional element that can dynamically route calls based on a variety of conditions. These might include time of day (e.g., a PSAP does not take calls between 2:00 a.m. and 6:00 a.m. so their calls are re-routed to a previously agreed upon location), network condition (e.g., if a PSAPs call volume is over a threshold, re-route the calls to a previously agreed upon location), and/or PSAP condition (e.g., if a PSAP is unavailable due to scheduled maintenance, a catastrophic condition, etc., re-route the calls to a previously agreed upon location).

The current industry design (as documented in NENA's i3 specification) does not provide a mechanism for the dynamic (re)routing of 9-1-1 calls based on a user provided geographic parameters. One familiar with 9-1-1 can see that such a capability is needed for temporary, geographically specific conditions such as a chemical spill, a natural disaster, or a scheduled extraordinary event (e.g., The Super Bowl, Olympics, etc.). This invention provides for this geographic-based policy routing of requests for emergency service. The current industry design also does not provide for a mechanism to detect and remedy a set of policies that create a "loop" in call delivery. A simple example of such a loop might be where PSAP A has a current policy in place that re-routes the call to PSAP B. Simultaneously, PSAP B has a current rule in place that routes the call to PSAP A. Such a situation could result in an emergency communication not getting delivered properly or potentially not delivered at all. This invention specifies a method to avoid and remedy looping conditions created by policy routing.

SUMMARY

The present invention provides a policy routing function for delivery of emergency communications calls to 9-1-1 (or comparable dialing strings), text messages to 9-1-1 (or comparable dialing strings), and any other electronic communications to 9-1-1 (or comparable dialing strings) that is based on a user provided geographic data set comprised of one or more geographic polygon layers. Each user provided geographic polygon layer within this data set will be represented by one or more polygons, with each polygon containing routing criteria, routing rules, priority, and expiration parameters. This geographic data set may also have a base geographic polygon layer of one or more polygons that define the "normal" or "default" routing conditions. Utilizing a user provided geographic data set the PRF will interrogate an emergency caller's location against the polygon(s) and apply the routing rules of the highest level geographic polygon layer polygon that has a true routing condition.

In the application of policy routing, a looping condition may arise. This may be based on the geographically based rule or on other rule conditions. The described invention provides for a set of instructions for each rule. Upon the first invocation of a rule, the first instruction for routing is executed. If the PRF is asked to locate routing for the same location within a time interval (previously configured by the PRF Administrator), the next instruction will be executed. This will continue until all instructions for a rule have been exhausted. Upon instruction exhaustion, the PRF will move to the next highest priority geographically based rule or other rule condition. These iterations through rules and their subordinate instructions continues until the call is handled. To ensure delivery, this invention specifies that the lowest level rule's instruction always be executable. This may be that the call is sent to a default location or that it is given some other treatment such as a "fast busy", a voice recording, or some other call terminating condition.

Both the use of polygon based routing conditions and policy loop detection are separately unique to current industry designs and proposals. Additionally, the combined use of both polygon based routing and policy loop detection is unique to current industry designs and proposals.

BRIEF DESCRIPTION OF THE DRAWINGS

FIG. 1 is a flow diagram for the primary PRF logic.

FIG. 2 is a flow diagram for rule and instruction iteration for PRF logic.

DETAILED DESCRIPTION

Referring to FIG. 1, a functional element involved in the delivery of emergency calls and/or data is generally indicated by reference numeral 100. The delivery of emergency calls and/or data that is seeking routing information to the appropriate PSAP invokes the PRF by passing it a location in Presence Information Data Format-Location Object ("PIDF-LO") 102 as defined in the IETF's RFC's 4119, 5139, 5491, 5774, 5962, and 6848. This PIDF-LO may contain a location formatted as a civic address (street, city, state, etc.) 104 or as a geodetic location (latitude, longitude, and optionally altitude). The PIDF-LO may contain any of the extensions defined in the aforementioned RFCs. Any location elements not needed by the PRF will be ignored.

If the PIDF-LO is formatted as a civic address 106, the PRF will perform a geo-coding process to convert the proffered location to a geodetic location 108.

The PRF will perform a query to identify which geographic polygon layer(s) contain this point (known as a "point in polygon query") 110. Since the invention defines the ability to have multiple geographic polygon layers with different priorities and routing instructions, this query will generally return an array of geographic polygon layers.

The PRF will then invoke a dereferencing routine described in FIG. 2. Each geographic polygon can have one or more rules 112.

Referring to FIG. 2, the PRF will determine whether the given location object has been examined within a user configured interval of time 114. If it has 116, a counter will be incremented 118 in order to facilitate the examination of the next rule within that geographic polygon.

The PRF will continue to examine each rule 120 within the geographic polygon layer (assuming a looping condition is causing the same location to be re-examined) until all rules for that polygon have been exhausted 122.

Once all rules for a given geographic polygon layer have been exhausted 124, the PRF will move to the next highest level geographic polygon layer level that contains the proffered location 126 and repeat the process by applying the rules 122.

Once a true rule has been found 128, the value of the Uniform Resource Identifier (URI) for routing is returned 130. The invention specifies that the lowest priority geographic polygon layer contain one rule that is unconditional and will result in the assignment of a URI 134. This URI may, at the PRF Administrator's configuration, be a known default route 132 or a call queue that invokes a voice message, a fast busy signal, or similar.

Regarding the invention being thus described, it will be obvious that the same may be varied in many ways. Such variations are not to be regarded as a departure from the spirit and scope of the invention, and all such modifications as would be obvious to one skilled in the art are intended to be included within the scope of the claims. It is to be understood that while certain now preferred forms of this invention have been illustrated and described, it is not limited thereto except insofar as such limitations are included in the following claims.

Having thus described the invention, what is claimed as new and desired to be secured by this patent is as follows:

1. A method for delivery of emergency calls or data comprising:
   receiving a presence information data format-location object (PIDF-LO) containing location data;
   if said PIDF-LO includes a civic address, converting said civic address to a geodetic location;
   performing a query to identify at least one geographic polygon layer corresponding to said geodetic location, wherein said at least one geographic polygon layer contains one or more policy rules comprising routing criteria, routing rules, priority level, and expiration parameters each in the form of a set of instructions for routing emergency calls or data corresponding to said geodetic location, and wherein the one or more policy rules in each of said at least one geographic polygon layers differ from the one or more policy rules in the other at least one geographic polygon layers;
   selecting a one of said two or more policy rules;
   executing said set of instructions for routing emergency calls or data of said selected rule;
   if said selected policy rule has been processed within a predetermined interval of time, applying said set of instructions of a next unexecuted one of said one or more policy rules having a higher priority level within said geographic polygon;
   when a said selected policy rule results in a true routing condition wherein said emergency calls or data are routed, identifying said selected policy rule as a true rule, and returning a value of a uniform resource identifier.

2. The method of claim 1 wherein said civic address includes a street, city and state address.

3. The method of claim 1 wherein said geodetic location includes latitude, longitude and altitude.

4. The method of claim 1 wherein said geographic polygon layer includes a plurality of layers.

5. The method of claim 4 further comprising performing a plurality of queries to examine each rule within a given geographic polygon layer.

6. The method of claim 5 further comprising moving to the next highest priority level geographic polygon layer level containing the location object and applying all rules for said given geographic polygon layer.

7. The method of claim 1 wherein said true rule is unconditional.

8. The method of claim 1 wherein said uniform resource identifier is a known default route.

* * * * *